United States Patent
Richard

(10) Patent No.: US 6,719,693 B2
(45) Date of Patent: Apr. 13, 2004

(54) APPARATUS AND SYSTEM FOR REAL-TIME SYNTHETIC FOCUS ULTRASONIC IMAGING

(75) Inventor: William D. Richard, Ballwin, MO (US)

(73) Assignee: BECS Technology, Inc., St. Louis, MO (US)

( * ) Notice: Subject to any disclaimer, the term of this patent is extended or adjusted under 35 U.S.C. 154(b) by 0 days.

(21) Appl. No.: 10/402,537

(22) Filed: Mar. 28, 2003

(65) Prior Publication Data

US 2003/0187357 A1 Oct. 2, 2003

Related U.S. Application Data

(60) Provisional application No. 60/368,961, filed on Mar. 29, 2002.

(51) Int. Cl.[7] ............................................. A61B 8/00
(52) U.S. Cl. ............................. 600/437; 600/448
(58) Field of Search ................................. 600/407–472; 365/230.01, 233, 194, 230.03, 189.02; 710/305, 105; 73/620–633; 367/7, 11, 130, 138; 128/916

(56) References Cited

U.S. PATENT DOCUMENTS

| | | | | |
|---|---|---|---|---|
| 5,235,985 A | * | 8/1993 | McMorrow et al. | 600/443 |
| 5,460,180 A | * | 10/1995 | Klepper et al. | 600/447 |
| 6,436,040 B1 | * | 8/2002 | Collamore et al. | 600/437 |
| 6,491,634 B1 | * | 12/2002 | Leavitt et al. | 600/447 |

* cited by examiner

Primary Examiner—Ali M. Imam
(74) Attorney, Agent, or Firm—Polster, Lieder, Woodruff & Lucchesi LC

(57) ABSTRACT

An apparatus for use in an ultrasonic imaging system adapted for generating synthetic focus images in real-time. The apparatus employs an integrated circuit architecture which is scalable and can be employed to construct real-time synthetic focus ultrasonic imaging systems having a large number of transducer array elements. The apparatus utilizes one field programmable gate array per image channel for data storage and sub-image generation. Each field programmable gate array includes on-chip block memories to store digitized ultrasonic signal return echo data and at least one block memory used to store data associated with each ultrasonic transmitter-receiver array pair. Logic inside the field programmable gate array calculates memory addresses during image generation to generate a time-of-flight surface and to form sub-images.

22 Claims, 2 Drawing Sheets

APPARATUS AND SYSTEM FOR REAL-TIME SYNTHETIC FOCUS ULTRASONIC IMAGING

CROSS-REFERENCE TO RELATED APPLICATIONS

The present application is related to, and claims the benefits of priority from, U.S. Provisional Patent Application Ser. No. 60/368,961, entitled "APPARATUS AND SYSTEM FOR REAL-TIME SYNTHETIC FOCUS ULTRASONIC IMAGING" filed on Mar. 29, 2002.

STATEMENT REGARDING FEDERALLY SPONSORED RESEARCH

Not Applicable.

BACKGROUND OF THE INVENTION

The present invention is related generally to ultrasonic imaging systems, and in particular to an ultrasonic imaging system utilizing scalable architecture permitting synthetic focus images to be generated in real-time.

Ultrasonic imaging systems are used in a wide range of applications ranging from fetal imaging to non-destructive evaluation. In developed countries, almost every fetus is imaged using ultrasonic imaging to monitor growth and development and to evaluate fetal health. Medical ultrasound systems are used in a wide variety of medical applications, ranging from cardiac evaluation to intra-operative neurosurgery for tumor location to breast cancer screening. Some example of non-medical uses of ultrasonic imaging systems include the location of faults in structures such as steel beams and aircraft wings, seismic imaging for mineral exploration, and synthetic-aperture radar for defense and commercial applications.

Unlike magnetic resonance imaging (MRI) or computer tomography (CT) systems, ultrasonic imaging systems provide real-time images. The generation of real-time images renders ultrasonic imaging systems attractive for many applications. In addition, when compared to MRI or CT systems, ultrasonic imaging systems are much lower in cost, and, as such, are the preferred method for imaging when cost is a concern (as it is in screening applications where large populations need to be imaged). Ultrasonic imaging uses non-ionizing radiation, unlike CT imaging systems, and is thus considered to have far fewer risks, especially when used over a period of many years as a screening method.

Traditional array-based ultrasonic imaging systems use a "focus and steer" method for forming images. In the "focus and steer" method, an ultrasonic beam is focused to transmit and receive at selected image points or pixels. For real-time operation, typically about 100 pixels are in focus. Producing a focus and steer image which is in exactly in-focus at each image pixel requires a data acquisition time which is the product of the number of image pixels and the round-trip time of the ultrasonic wave.

For acceptable image sizes, the data acquisition time using the "focus and steer" method in an ultrasonic imaging system is so large that it is impractical to form real-time images which are in focus at each image pixel. Hence, in a system utilizing "focus and steer" methods, absolute focus of each pixel in the image is compromised in order to achieve real-time frame rates.

An alternative to "focus and steer" methods in ultrasonic imaging, known as synthetic focus imaging, uses the complete dataset of image data. All transmitter-receiver array element pairs are used to acquire ultrasonic backscatter data. The data acquisition time for a synthetic focus imaging approach to the generation of ultrasonic images, which are in-focus at each pixel, is short enough to support real-time imaging for acceptable image sizes, e.g., 512 by 512 pixels. The computation requirements, however, for synthetic focus imaging are very large.

Synthetic focus imaging offers the possibility of providing for early detection and staging of cancers, especially for static, easy to insonify glands like breast and prostate tissue. Cancers in these tissues are among the leading causes of new cancer cases. Ultrasonic imaging is currently utilized to detect and stage these cancers, but the systems are limited by resolution and contrast capabilities. Synthetic focus imaging systems separate data acquisition from image formation and can provide in-focus information at every image pixel. This permits image contrast to be easily adjusted to compensate for various properties of the tissues being examined. However, current synthetic focus imaging systems have relatively long image-formation time. This is due to the fact that the synthetic-focus image acquisition time is proportional to the number of ultrasonic transducers in the transmit/receive array. Conversely, the time required for image formation using convention focus-and-steer configurations is proportional to the number of focal points in the image. Therefore, since the number of pixels in an image is typically orders of magnitude greater than the number of transducers, acquiring an in-focus image with conventional systems is impractical.

In synthetic-focus imaging systems, the following computation is required to calculate a single pixel p(i,j) using data from an N element transducer array (N sources and N sensors). TOF(i, j, m, n) is the time-of-flight contribution to pixel p(i,j) from source m and sensor n:

$$p(i, j) = \sum_{m=1}^{m=N} \sum_{n=1}^{n=N} f(TOF(i, j, m, n))$$

The time needed to generate an image can be broken down into the following principal tasks: (1) time-of-flight (TOF) calculation; (2) retrieval of backscattered signals from memory; and (3) summation of backscattered values to define each pixel value.

Linear array and phased array ultrasonic imaging systems that use the traditional "focus and steer" method for forming real-time images are common. To date, however, there has not been a real-time synthetic focus ultrasonic imaging system developed which captures images large enough to be used for diagnostic purposes. Synthetic focus ultrasound images have been formed using data acquisition hardware and off-line computation engines, including single processor and multi-processor computer systems. However, none of these systems is capable of achieving real-time synthetic focus image generation using the complete data set of image pixels for reasonable sized images.

A method for computing, in real-time, the time-of-flight surfaces required to form synthetic focus images is described by S. R. Broadstone and R. M. Arthur in ""*An Approach To Real-Time Reflection Tomography Using The Complete Dataset*", in proceedings 1986 Ultrasonics Symposium, Vol. 86CH2375-4, pp. 829–831, IEEE Press, 1986, (the Broadstone and Arthur reference). The Broadstone and Arthur reference further describes an integrated circuit implementation of the disclosed method. In the integrated circuit design, one time-of-flight calculator is required for each transmit/receive transducer pair in a massively parallel ultrasonic imaging system in order to form real-time synthetic focus images. However, the Broadstone and Arthur reference does not provide a complete, realizable architecture for a synthetic-focus imaging system capable of being constructed using currently available integrated circuit components or technologies.

Current ultrasonic imaging systems which utilize the "complete data set" for image formation require large numbers of components per channel for data storage and image generation. These hardware requirements would be exacerbated in the implementation of a real-time imaging system, and, for this reason, none have been constructed.

Accordingly, there is a need for a real-time synthetic-focus ultrasonic imaging system which exploits parallelism to facilitate data storage and image generation, which is capable of producing images of a size which are sufficiently useful for diagnostic purposes, and which permits adaptive image generation through iterative image processing to simultaneously extract sample properties and improve image quality.

BRIEF SUMMARY OF THE INVENTION

Briefly stated, the present invention provides an apparatus for use in an ultrasonic imaging system adapted for generating synthetic focus images in real-time. The apparatus employs a parallel processing integrated circuit architecture which is scalable and can be employed to construct real-time synthetic focus ultrasonic imaging systems having a large number of transducer array elements. The apparatus provides the ability to quickly and iteratively generate candidate final images based on a single complete dataset of image pixels, and facilitates the development of optimization techniques for accurate speed of sound extraction.

In one embodiment, the architecture of the ultrasonic imaging system of the present invention employs a single field-programmable gate array (FPGA) or ASIC for data storage and sub-image generation for each transducer pulser/receiver channel. The FPGAs are configured with on-chip block memories to store digitized return echo data, and optionally with one or more block memories which are configured to hold data associated with each transmitter receiver pair in the ultrasonic imaging system. Additional logic inside each FPGA is used to calculate memory addresses during image generation to generate the time-of-flight surfaces and to form required sub-images, which are in-turn, combined to produce a completed ultrasonic image.

A method of the present invention propagates ultrasonic energy towards a sample object and receives the reflected echoes. The received echoes are digitized and stored, and subsequently utilized with one or more coefficients to generate an ultrasonic image of the sample object. By altering the coefficients, adaptive image generation from the complete set of image pixel data facilities the generation of subsequent images having varied focus or contrast from the initial image.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
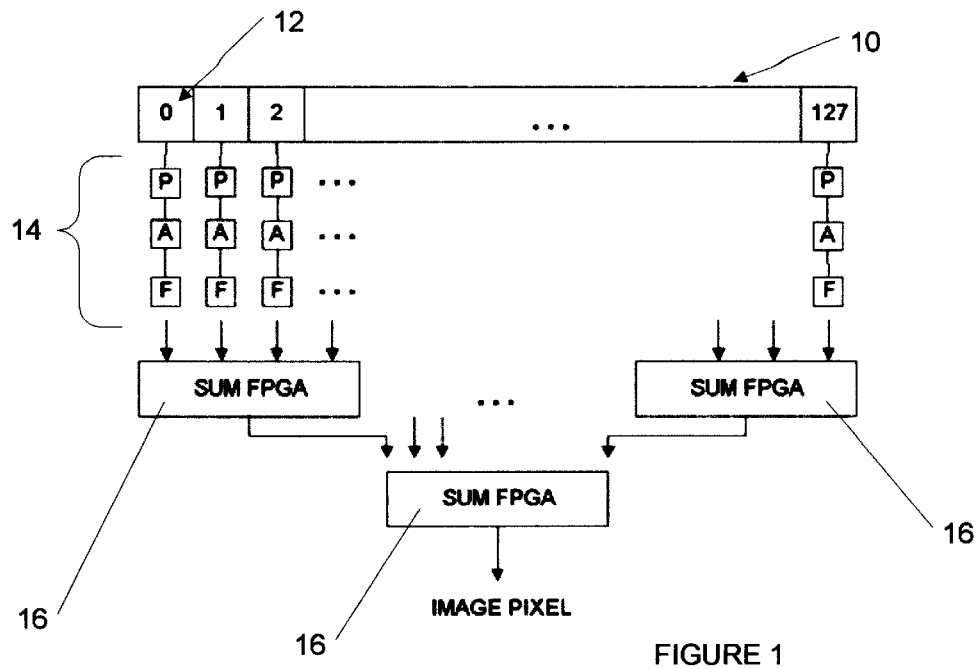
FIG. 1 is a block diagram representation of a 128-element, one-dimensional array of the present invention used to form real-time two-dimensional ultrasonic images.

Turning to FIG. 1, a preferred embodiment 128-element one-dimensional ultrasonic transducer array of the present invention used to form two-dimensional images is shown generally at 10. Each element 12 of the array 10 includes a set of processing circuits, indicated generally at 14. The first processing circuit in each set 14, indicated as "P" in FIG. 1, consists of a an ultrasonic transmitter configured to propagate a pulse of ultrasonic energy towards a sample undergoing testing or imaging, and an ultrasonic receiver configured to receive ultrasonic return echoes reflected from a sample undergoing testing or imaging. Coupled to each pulser/receiver "P" is an analog-to-digital converter, designated as "A" in FIG. 1.

Figure 2:
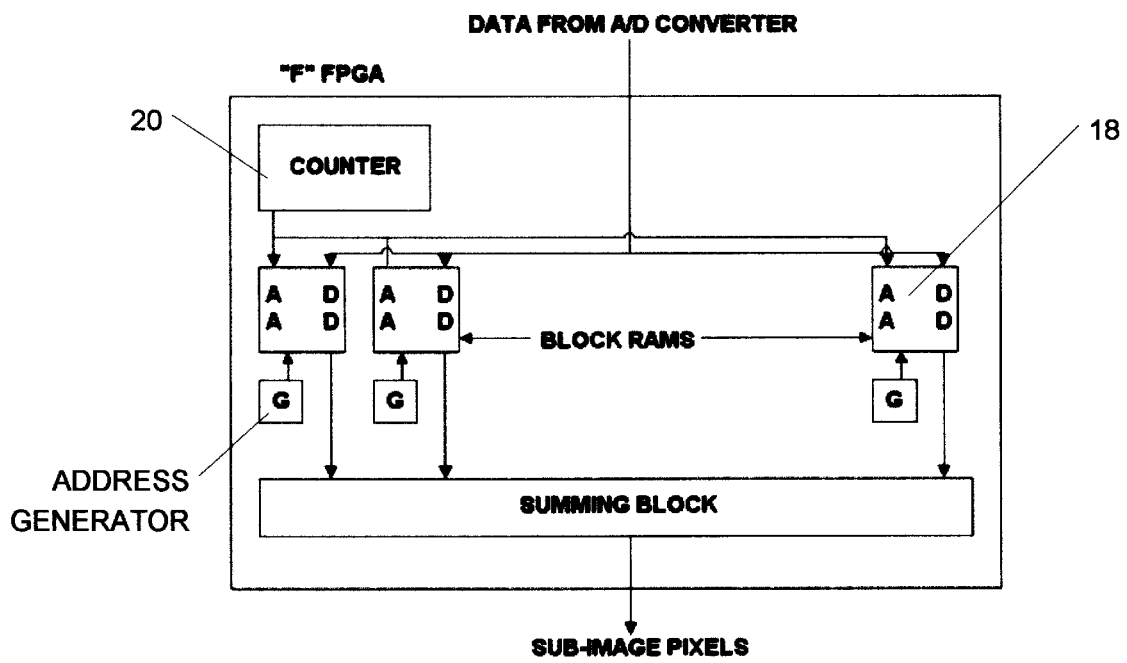
FIG. 2 is a block diagram illustration of the internal circuit architecture of an "F" FPGA component of the array shown in FIG. 1.

Output from each analog-to-digital converter "A" is stored in an associated image generation processor, preferably a field programmable gate array (FPGA) "F". As shown in FIG. 2, each FPGA "F" is configured with a number of integrated block random access memories (RAMS) 18 for data storage. The minimum number of RAMs 18 with which each FPGA "F" is configured corresponds to the size of the transducer array 10, i.e. 128 block RAMs 18 in the present example. The RAMs 18 shown in FIG. 2 are preferably dual-port storage circuits, however, those of ordinary skill in the art will recognize that single-port memories of any type, such as SRAM, DRAM, etc. may be utilized together with suitable access logic circuits, in place of dual-port RAMs 18 without altering the scope of the invention.

During operation, when the pulser/receiver "P" associated with element zero in the transducer array 10 is pulsed, each FPGA "F" stores digitized return echoes received during a sample period, from an associated pulser/receiver "P", in a corresponding integrated block RAM 18, i.e. a "zero" block RAM. The digitized return echoes are stored sequentially in the block RAM during the sample period, forming a linear array of data. In essence, each set of block RAMs 18 in an FPGA "F" store a complete sub-image of the sample material which corresponds to the ultrasonic return echoes received at the associated pulser/receiver P for a single pulse of a pulser/receiver.

When the pulser/receiver "P" of element one in the transducer array 10 is pulsed, each FPGA "F" stores the digitized return echoes received from an associated pulser/ receiver "P" in a second corresponding integrated block RAM 18, i.e. a "one" block RAM. This process is repeated for activation of each element 12 in the transducer array 10 to provide each FPGA "F" with 128 digitized sets of return echoes, i.e. data which may be used to generate sub-images, which are stored in the corresponding integrated block RAMs 18. This architecture allows a complete data-set of received ultrasonic echoes to be stored in each FPGA "F" associated with each transducer element 12.

Output from each FPGA "F" is coupled to a reducing tree summation network, indicated generally at 15. In the embodiment shown in FIG. 1, the summation network 15 consists of a plurality of operatively coupled summing field programmable gate arrays 16. To generate a complete ultrasonic image of the sample, data corresponding to an individual pixel location in the complete ultrasonic image is extracted in parallel from each block RAM 18 in each FPGA "F", and combined through the summing network 15 to yield a final pixel value for the individual pixel location. This process is repeated for each pixel location in the complete ultrasonic image. Those of ordinary skill in the art of circuit design will recognize that the number of summing FPGAs 16 utilized in the summation network 15 is a function of the number of elements in the transducer array 10, and the number of inputs and outputs provided on each summing FPGA 16 required to reduce the total number of inputs to a single output.

Turning to FIG. 2, the internal architecture of each "F" FPGA is shown. The block RAMs 18 are configured to be accessed in parallel during an ultrasonic image generation procedure, so that ultrasonic sub-images associated with the return echo data stored inside each FPGA "F" can be calculated in real time (i.e. one sub-image pixel can be calculated on each access cycle/clock cycle). To calculate one sub-image pixel from the data stored in each block RAM 18, a memory address location storing data corresponding to the desired pixel location in each block RAM 18 is accessed to retrieve the stored data. The required addresses are calculated using integrated address calculators "G" constructed using the logic available inside the FPGA "F". In the preferred embodiment shown in FIGS. 1 and 2, 128 independent address calculators "G" are implemented inside each FPGA "F", one for each block RAM 18. Those of ordinary skill in the field of integrated circuit design will recognize that address generators "G" may be constructed within each FPGA "F" using standard logic design techniques. Once the stored data for a single pixel location is retrieved in parallel from each block RAM 18, the data is passed to the summing block where it is combined to produce data representative of a single sub-image pixel.

During operation of the embodiment shown in FIGS. 1 and 2, each block RAM 18 in a FPGA "F" is filled, in turn, as each pulser/receiver "P" of the transducer array 10 are pulsed. Data received at each FPGA "F" from the analog-to-digital converter "A" drives the data inputs on one side of each block RAM 18. The required storage address identifying the block RAM 18 to be used is generated using a simple counter 20 that is reset to zero at the beginning of each pulse/receive/acquisition cycle by a global controller (not shown).

After a complete data set has been acquired (i.e. each transducer element 12 has been pulsed once, providing a corresponding number of data sets stored in each FPGA "F"), the global controller initiates an image generation cycle. This resets each "G" address generator to, for example, the memory address in each block RAM 18 which has been chosen to correspond to the upper-left corner pixel of the sub-image. Each "G" address generator outputs the address for its block RAM 18. All block RAMs are accessed in parallel, and, in one RAM access cycle, all of the samples required to form the first subimage pixel are read from the dual port block RAMs. The adder tree/summing network 15 is used to add the samples to form the first pixel in the sub-image. Optionally, the summation is pipelined, but this is easily accomplished inside the FPGA. The output of the summing network is feed out of the FPGA "F" as a sub-image pixel value, and is combined with to the other sub-image pixel values that are generated in parallel from the other "F" FPGAs to yield a single pixel value for the complete ultrasonic image.

The "G" address generators are designed to output the next associated sample memory address in an associated block RAM 18 each time they are clocked, and the sub-image pixels are generated one-per-clock-cycle. The "G" address generators can be implemented in several different ways. A preferred method uses the difference equation approach described by the Broadstone and Arthur reference. With the integration levels available today or in the future, it is possible to directly calculate the required time of flight inside each "G" address generator and still produce one address per clock cycle (or one address every N clock cycles if a slightly lower frame rate is acceptable). As integration levels increase, it may be possible to simply store a table of the required address values. The architecture described herein can use any of the possible forms for the "G" address generator.

There are alternative architectures that are obvious minor modifications of the architecture proposed above. For example, rather than use additional summing FPGA 16 to sum the sub image pixels, this summation could be done in a serial fashion as depicted in the FIG. 3. This solution introduces a pipeline delay that causes the initial image pixel to be delayed by N clock ticks, where there are N elements 12 in the transducer array 10, but, once the pipeline is full, one image pixel for the complete ultrasonic image is produced every clock cycle. The overhead associated with filling the pipeline is small, and real-time imaging is possible even with this architecture.

Figure 3:
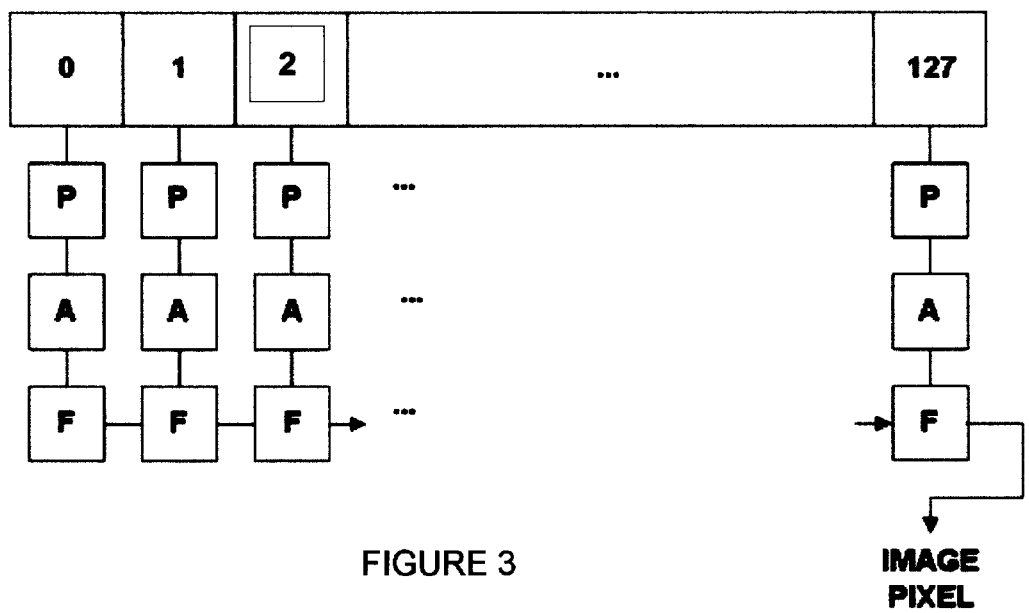
FIG. 3 illustrates a summation operation of the present invention performed in a serial fashion.
Figure 4:
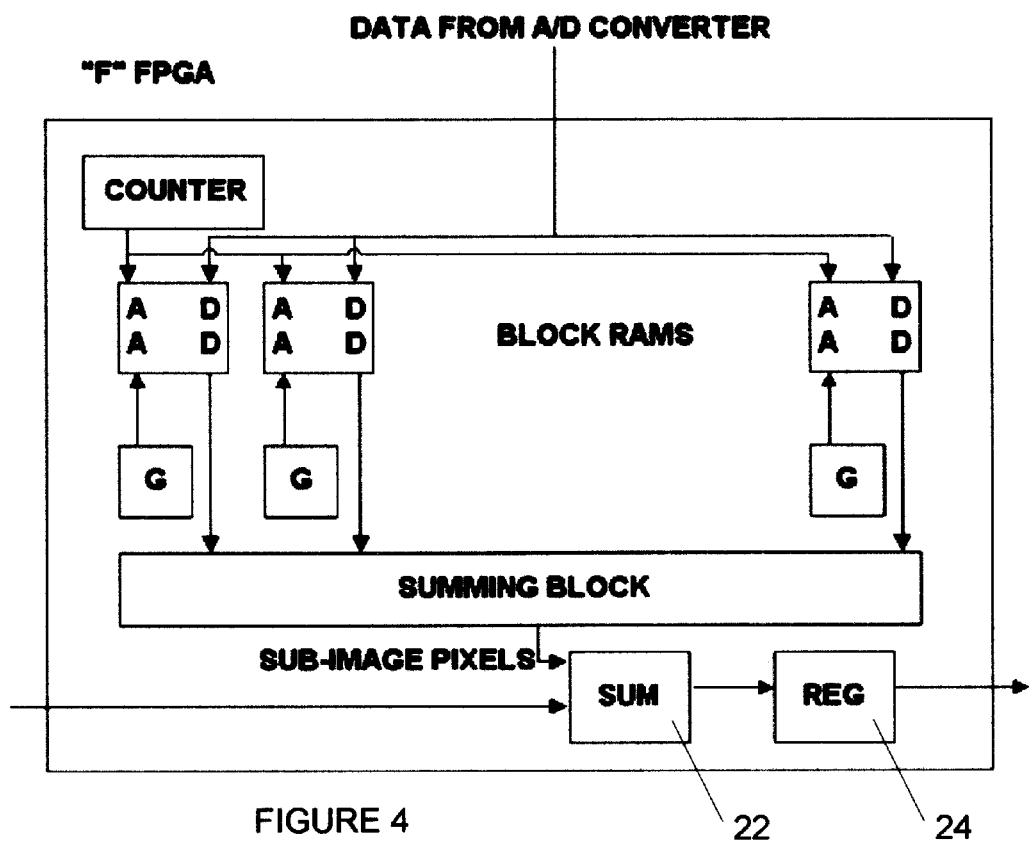
FIG. 4 is a block diagram illustration of an alternate internal circuit architecture of an "F" FPGA component of the array shown in FIG. 1.

With the architecture shown in FIG. 3, it is necessary to stage the generation of each sub-image pixel, or delay each successive sub-image generation, so that the appropriate sub-image pixels are added together within the pipeline to produce the image pixel for the complete ultrasonic image. To provide for serial addition of the image data, as shown in FIG. 3, the internal architecture of each FPGA "F" must is modified slightly. The modifications necessary are shown in FIG. 4, and include the addition of a summation block 22 to combine the image pixel data from the FPGA "F" with the image pixel data received on a second input line from a previous FPGA "F" in the series pipeline. The combined image pixel data is stored in a register 24, prior to being output down the pipeline to the next subsequent FPGA "F".

Those of ordinary skill in the art will recognize that other integrated circuit architectures which are slight modifications of the integrated circuit architectures presented here which are obvious extensions of the basic concept of accessing all block RAMs 18 in parallel, summing the retrieved pixel data to first form image pixels, and then summing each of the sub-image pixels to form the individual pixels of the final synthetic focus image.

The architecture presented thus far has focused on using commercially available FPGAs "F" with large numbers of on-chip block RAMs 18 to implement a real-time synthetic focus imaging system. FPGAs "F" with as many as 556 block RAMs 18 have been recently introduced by Xilinx (the Xilinx XC2VP125), and FPGAs "F" with larger numbers of block RAMs 18 are anticipated. An FPGA with 556 block RAMs 18 could support, using the architecture described here, an ultrasonic transducer array 10 with up to 278 elements 12.

There is no requirement, however, that FPGAs be used to implement this architecture. Custom Application Specific Integrated Circuits, or ASICs, could also be designed with large numbers of block RAMs 18 and used to implement the architecture described here. The architecture described here is identical if ASICs are used instead of FPGAs.

There is also no requirement that an FPGA or ASIC be associated with each transducer element in cases where a single FPGA or ASIC can implement the block RAMs and logic associated with one or more of the FPGAs or ASICs described above. For example, one XC2VP125 could implement the block RAMs and logic associated with four transducer elements in a 129-element system since this component actually has four times the number of block RAMs required for a single channel.

To render accurate ultrasonic images it is necessary to either have a priori, or to acquire, accurate knowledge of the speed of sound in the material or tissue being imaged. Reconstruction of a backscatter image from a complete dataset requires that the time-of-flight (TOF) be calculated from the average speed of sound (SOS) along the path from the source to the volume of interest in the material undergoing testing or imaging, and back to the receiver. Using an incorrect SOS generally results in an out-of-focus image, while using an accurate estimate of the SOS can significantly improve image quality. During operation, the preferred embodiment of the present invention is initially provided with an assumed average and constant speed of sound associated with the tissue or material being imaged.

By iteratively modifying the time-of-flight surfaces generated by the "G" blocks (i.e. the block RAM memory address locations corresponding to desired pixel data) as part of an optimization algorithm which changes coefficients such as the assumed average speed of sound, it is possible to actually extract information about tissue properties, the true speed of sound at each pixel in an ultrasonic image, and to compensate for tissue inhomogeneity. The system is initially configured with coefficients to assume an average, constant speed of sound associated with the tissue or material being imaged under normal circumstances. The optimization approach of the present invention employs information and features extracted from the initial complete ultrasonic image to alter one or more coefficients and to generate one or more new time-of-flight surfaces (i.e. block RAM memory address locations corresponding to desired pixel data) that are used to regenerate additional images from the same initial complete data set stored in the block RAMs 18. Since the system is capable of forming multiple images per second, the optimization algorithm can consider many different candidate final images. Those of ordinary skill in the art will recognize that many different optimization techniques could be used to alter the coefficients to identify the correct speed of sound, and correspondingly, produce the most accurate images for the tissue or material undergoing the imaging.

For example, the "G" blocks may be implemented using parameterized time of flight surfaces via difference equations with a finite set of coefficients (or in some other way using a finite set of coefficients). These coefficients are then changed iteratively by an optimization algorithm in order to find the true time-of-flight surfaces for the tissue or material being imaged. The approach described above could be extremely powerful and may allow the difference between tissue types, for example, to be extracted based on speed of sound measurements.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into an executed by a computer, the computer becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved ultrasonic imaging system having a plurality of transmitter/receiver array elements configured to propagate a pulse of ultrasonic energy towards the surface of a sample, and to receive a return echo, the improvement comprising:

a plurality of processing circuit sets, each of said plurality of processing circuit sets associated with one of the plurality of transmitter/receiver array elements;

wherein each of said plurality of processing circuit sets is configured to store a plurality of data values representative of a plurality of digitized ultrasonic return echoes received at an associated transmitter/receiver array element during discrete sample periods; and wherein each of said plurality of processing circuit sets is further configured for parallel access to said stored plurality of data values during image generation.

2. The improved ultrasonic imaging system of claim 1 wherein each of said plurality of processing circuit sets includes a field programmable gate array.

3. The improved ultrasonic imaging system of claim 1 wherein each of said plurality of plurality of processing circuits includes an application specific integrated circuit.

4. The improved ultrasonic imaging system of claim 1 wherein each of said plurality of processing circuit sets includes at least one memory, said at least one memory configured to store data representative of a digitized ultrasonic return echo.

5. The improved ultrasonic imaging system of claim 4 wherein each of said plurality of plurality of processing circuit sets includes at least one time-of-flight calculator associated with said at least one memory, said time-of-flight calculator configured to calculate one or more internal memory addresses in said at least one memory.

6. The improved ultrasonic imaging system of claim 1 further including at least one summing circuit configured to receive input from each of said plurality of processing circuit sets representative of a component of an ultrasonic image pixel, and to generate an output representative of an ultrasonic image pixel.

7. The improved ultrasonic imaging system of claim 6 wherein said at least one summing circuit include one or more summing field programmable gate arrays.

8. The improved ultrasonic imaging system of claim 6 wherein said at least one summing circuit is configured to sequentially sum data from each of said plurality of processing circuits.

9. An ultrasonic image processing architecture including:
   a plurality of ultrasonic transducers elements, each of said plurality of ultrasonic transducer elements including an ultrasonic transmitter and an ultrasonic receiver;
   a plurality of analog-to-digital converters, each of said plurality of analog-to-digital converters operatively coupled to an associated ultrasonic transducer element in said plurality of ultrasonic transducer elements;
   a plurality of image generation processors, each of said plurality of image generation processors having an input operatively coupled to an associated analog-to-digital converter in said plurality of analog-to-digital converters and an output; and
   wherein each of said image generation processors further includes a memory configured to store a plurality of digitized image data sets received from said associated analog-to-digital converters, and a plurality of address generators configured to output memory address locations associated with each of said plurality of digitized image data sets.

10. The ultrasonic image processing architecture of claim 9 further including a summation network coupled to the output of each of said plurality of image generation processors, said summation network having an image pixel output.

11. The ultrasonic image processing architecture of claim 9 wherein each of said plurality of image generation processors is a field programmable gate array including a plurality of random access memory blocks configured to store digitized image data.

12. The ultrasonic image processing architecture of claim 9 wherein a first non-exclusive set of said plurality of image generation processors includes a second input;
   wherein said output from each of a second non-exclusive set of said plurality of image generation processors is operatively connected to said second input of a next adjacent image generation processor of said first set;
   wherein said output from a final image generation processor in said second set, having no next adjacent image generation processor, is an image pixel output;
   wherein each of said plurality of image generator processors in said first non-exclusive set includes a summing component receiving input from said memory and from said second input, said summing component operatively coupled to said output.

13. A method for ultrasonic imaging of a sample material including the steps of:
   propagating a pulse of ultrasonic energy towards the surface of the sample material from a single source;
   receiving a plurality of return echoes at a plurality of points for a predetermined sample period;
   digitizing each of said plurality of return echoes;
   storing each of said digitized plurality of return echoes;
   utilizing said stored digitized plurality of return echoes, together with at least one coefficient parameter, to generate a first ultrasonic image;
   at least once, altering said at least one coefficient parameter and generating a second ultrasonic image utilizing said stored digitized plurality of return echoes together with said altered at least one coefficient parameter.

14. The method of claim 13 for generating an ultrasonic image wherein the step of altering said at least one coefficient parameter involves selectively altering said coefficient parameter to generate a second ultrasonic image which differs from said first ultrasonic image.

15. The method of claim 13 for generating an ultrasonic image wherein the step of altering said at least one coefficient parameter involves selectively altering said coefficient parameter to generate a second ultrasonic image having an altered focus from said first ultrasonic image.

16. The method of claim 13 for generating an ultrasonic image wherein the step of altering said at least one coefficient parameter involves selectively altering said coefficient parameter to generate a second ultrasonic image having an altered contrast from said first ultrasonic image.

17. The method of claim 13 for generating an ultrasonic image wherein said at least one coefficient parameter is a representation of a speed of sound.

18. The method of claim 17 for generating an ultrasonic image wherein the step of altering said at least one coefficient parameter involves selectively altering said coefficient parameter to identify a speed of sound at one or more pixel locations in said first ultrasonic image.

19. A method for generating an ultrasonic image of a sample material from an ultrasonic transducer array having a plurality of ultrasonic transmitter and receiver elements, including the steps of:
   pulsing, in a predetermined sequence, each of said plurality of ultrasonic transmitter elements;
   receiving, at each of said plurality of ultrasonic receiver elements, an ultrasonic return echo data set for each of said pulses;
   storing each of said received ultrasonic return echo data sets in a memory associated each of said plurality of ultrasonic receiver elements;
   extracting in parallel, from each stored received ultrasonic return echo data set, an image pixel component;
   combining each of said extracted image pixel components to generate a single image pixel in the ultrasonic image; and
   repeating the steps of extracting and combining for a complete set of image pixels in the ultrasonic image.

20. The method of claim 19 for generating an ultrasonic image wherein the step of extracting includes the step of identifying, using one or more coefficients, an address in said memory, said address identifying a storage location for data corresponding to a desired image pixel component.

21. The method of claim 20 wherein said one or more coefficients is a representation of the speed of sound in the sample material.

22. The method of claim 20 further including the steps of altering said one or more coefficients; and repeating the steps of extracting and combining to generate at least one additional ultrasonic image.

* * * * *